US012000924B2

(12) United States Patent
Graham et al.

(10) Patent No.: US 12,000,924 B2
(45) Date of Patent: Jun. 4, 2024

(54) SYSTEMS AND METHODS FOR NONINVASIVE DETECTION OF IMPERMISSIBLE OBJECTS

(71) Applicant: Lassen Peak, Inc., North Bend, WA (US)

(72) Inventors: Hatch Graham, North Bend, WA (US); Ehsan Afshari, Ann Arbor, MI (US); Karl Triebes, Kirkland, WA (US); Ryan Kearny, Kirkland, WA (US)

(73) Assignee: LASSEN PEAK, INC., North Bend, WA (US)

( * ) Notice: Subject to any disclaimer, the term of this patent is extended or adjusted under 35 U.S.C. 154(b) by 361 days.

(21) Appl. No.: 17/515,421

(22) Filed: Oct. 30, 2021

(65) Prior Publication Data

US 2022/0214447 A1 Jul. 7, 2022

Related U.S. Application Data

(63) Continuation-in-part of application No. 17/472,156, filed on Sep. 10, 2021.
(Continued)

(51) Int. Cl.
*G01S 13/88* (2006.01)
*G01S 13/89* (2006.01)
*G08B 5/22* (2006.01)

(52) U.S. Cl.
CPC ............ *G01S 13/887* (2013.01); *G01S 13/89* (2013.01); *G08B 5/22* (2013.01)

(58) Field of Classification Search
CPC .......... G01S 13/887; G01S 13/89; G08B 5/22
See application file for complete search history.

(56) References Cited

U.S. PATENT DOCUMENTS 6,359,582 B1 3/2002 Macaleese
7,209,035 B2 4/2007 Tabankin
(Continued)

FOREIGN PATENT DOCUMENTS

WO    WO 2007086916 A2    2/2007
WO    WO 2009067627 A1    5/2009
WO    WO 2009131806 A1    10/2009

OTHER PUBLICATIONS

K. Statnikov, J. Grzyb, N. Sarmah, B. Heinemann and U. R. Pfeiffer, "A lens-coupled 210-270 GHz circularly polarized FMCW radar transceiver module in SiGe technology," 2015 European Microwave Conference (Eu MC), Paris, France, 2015, pp. 550-553, doi: 10.1109/EuMC.2015.7345822. (Year: 2015).
(Continued)

*Primary Examiner* — Peter M Bythrow
*Assistant Examiner* — Nazra Nur Waheed

(57) ABSTRACT

An apparatus comprises a first and second coherent radar system on a first chip configured to operate in a terahertz range to provide a frequency modulated continuous wave, and having a first and second field of view, respectively. The apparatus further comprises a first processor in communication with the first coherent radar system and configured to include instructions to send a first signal to the first coherent radar system to scan a target with the first field of view, and a second processor in communication with the second coherent radar system and configured to collaborate with the first processor, and further configured to include instructions to send a second signal to the second coherent radar system to scan a target within the second field of view.

19 Claims, 10 Drawing Sheets

Related U.S. Application Data

(60) Provisional application No. 63/143,880, filed on Jan. 31, 2021, provisional application No. 63/134,373, filed on Jan. 6, 2021.

(56) References Cited

U.S. PATENT DOCUMENTS

| | | | |
|---|---|---|---|
| 7,920,088 | B2 | 4/2011 | Thompson |
| 7,973,704 | B2 | 7/2011 | Storz |
| 8,253,619 | B2 | 8/2012 | Holbrook |
| 8,472,884 | B2 | 6/2013 | Ginsburg |
| 8,547,274 | B2 | 10/2013 | Reinpoldt, III |
| 9,029,778 | B1 | 5/2015 | Boyd |
| 9,223,018 | B2 | 12/2015 | Dayi |
| 9,316,732 | B1* | 4/2016 | Mohamadi ........ G01S 13/0209 |
| 9,562,969 | B2 | 2/2017 | Wang |
| 9,575,172 | B2 | 2/2017 | Charpentier |
| 10,247,809 | B2 | 4/2019 | Testar |
| 10,754,027 | B2 | 8/2020 | Dayi |
| 10,948,587 | B1 | 3/2021 | Boronse |
| 11,598,866 | B2 | 3/2023 | Sleasman |
| 11,607,151 | B2 | 3/2023 | Yarkoni |
| 2003/0162521 | A1 | 8/2003 | Vorenkamp |
| 2004/0090359 | A1 | 5/2004 | McMakin |
| 2006/0017605 | A1 | 1/2006 | Lovberg |
| 2008/0129581 | A1* | 6/2008 | Douglass ............ G01S 13/34 342/52 |
| 2010/0090886 | A1 | 4/2010 | Beasley |
| 2010/0117885 | A1 | 5/2010 | Holbrook |
| 2010/0214150 | A1 | 8/2010 | Lovberg |
| 2011/0181300 | A1 | 7/2011 | Bowring |
| 2011/0304498 | A1 | 12/2011 | Yanagihara et al. |
| 2012/0081544 | A1 | 4/2012 | Wee |
| 2012/0293355 | A1 | 11/2012 | Marianer et al. |
| 2013/0033574 | A1 | 2/2013 | Kuznetsov |
| 2013/0207830 | A1 | 8/2013 | Watts et al. |
| 2014/0144009 | A1 | 5/2014 | Chattopadhyay |
| 2015/0285907 | A1 | 10/2015 | Mohamadi |
| 2015/0293221 | A1 | 10/2015 | Ahmed |
| 2016/0116581 | A1 | 4/2016 | Mohamadi |
| 2016/0223669 | A1 | 8/2016 | Assefzadeh |
| 2016/0291148 | A1 | 10/2016 | Ellenbogen |
| 2017/0031004 | A1 | 2/2017 | Jales |
| 2017/0038467 | A1 | 2/2017 | Levita |
| 2017/0212059 | A1* | 7/2017 | Charvat ............ G01S 13/887 |
| 2018/0217249 | A1 | 8/2018 | La Salla et al. |
| 2019/0293833 | A1 | 9/2019 | Chen |
| 2020/0064996 | A1 | 2/2020 | Giusti |
| 2020/0311899 | A1* | 10/2020 | Piette ................ G01S 17/87 |
| 2020/0326416 | A1 | 10/2020 | Albasha et al. |
| 2020/0341493 | A1 | 10/2020 | Sabato |
| 2020/0389624 | A1 | 12/2020 | Oberholzer |
| 2020/0408899 | A1 | 12/2020 | Nanzer |
| 2021/0278526 | A1 | 9/2021 | Pedross-Engel |
| 2022/0066065 | A1 | 3/2022 | Zhao |
| 2022/0179062 | A1 | 6/2022 | Amir |
| 2022/0221576 | A1 | 7/2022 | Zhao |
| 2022/0365205 | A1 | 11/2022 | Gal |
| 2022/0390590 | A1 | 12/2022 | Marchese |

OTHER PUBLICATIONS

J. Grzyb, K. Statnikov, N. Sarmah, B. Heinemann and U. R. Pfeiffer, "A 210-270-GHz Circularly Polarized FMCW Radar With a Single-Lens-Coupled SiGe HBT Chip," in IEEE Transactions on Terahertz Science and Technology, vol. 6, No. 6, pp. 771-783, Nov. 2016, doi: 10.1109/TTHZ.2016.2602539. (Year: 2016).

P. Hillger, J. Grzyb, R. Jain and U. R. Pfeiffer, "Terahertz Imaging and Sensing Applications With Silicon-Based Technologies," in IEEE Transactions on Terahertz Science and Technology, vol. 9, No. 1, pp. 1-19, Jan. 2019, doi: 10.1109/TTHZ.2018.2884852. (Year: 2019).

A. J. Seeds et al., "Coherent terahertz systems," 2012 IEEE International Topical Meeting on Microwave Photonics, Noordwijk, Netherlands, 2012, pp. 278-281, doi: 10.1109/MWP.2012.6474112.

* cited by examiner

SYSTEMS AND METHODS FOR NONINVASIVE DETECTION OF IMPERMISSIBLE OBJECTS

CROSS-REFERENCE TO RELATED APPLICATIONS

This application claims priority to U.S. Provisional Patent Application No. 63/143,880, filed on Jan. 31, 2021 and titled Systems and Methods for Noninvasive Detection of Impermissible Objects, the contents of which are hereby incorporated by reference in their entirety; this application further claims priority as a continuation in part to U.S. patent application Ser. No. 17/472,156, filed on Sep. 10, 2021 and titled Systems and Methods for Multi-Unit Collaboration for Noninvasive Detection of Concealed Impermissible Objects, the contents of which are hereby incorporated by reference in their entirety, which claims priority to U.S. Provisional Patent Application No. 63/134,373, filed on Jan. 6, 2021 and titled Systems and Methods for Multi-Unit Collaboration for Noninvasive Detection of Concealed Impermissible Objects, the contents of which are hereby incorporated by reference in their entirety.

BACKGROUND

In 1968, the Supreme Court issued its landmark decision in the case of Terry v. Ohio, in which the Court held that the U.S. Constitution's prohibition on unreasonable search and seizure of citizens is not violated when a police officer searches a citizen under the circumstances that the police officer has a reasonable suspicion that a citizen is committing, or is about to commit, a crime, and the police officer has a reasonable belief that the citizen may be armed and dangerous. As the Court stated, "[w]hen an officeris justified in believing that the individual whose suspicious behavior he is investigating at close range is armed and presently dangerous to the officer or others, it would appear to be clearly unreasonable to deny the officer the power to take necessary measures to determine whether the person is, in fact, carrying a weapon and to neutralize the threat of physical harm."

The ruling in the Terry case has led to the widespread use of so-called stop-and-frisk practices by police departments throughout the country, also called "Terry Frisks." The legal boundaries of a Terry, however, are always in question, and have led to claims of racial profiling. In addition, because of the physical nature of a Terry Frisk, a police officer frisking a person must be close enough to actually touch the person, leading to increased danger to the police officer. Thus, in a Terry Frisk, both the public and the police suffer. The subjects of the search tend to become infuriated by the physical contact and the limits to their freedom, and the police officer performing the frisk is put in peril because of their close proximity to a now-infuriated suspect. In addition, the Terry Frisk is prone to error, with police officers often missing the existence of weapons.

In addition to the Terry Frisk, which is a non-consensual interaction between the police and a subject, the public is regularly subjected to a variety of consensual stops and searches. A consensual search is a search in which an individual either implicitly or explicitly gives consent for a search to be conducted as a condition for something else, like entry into a sporting venue, or prior to boarding an airplane. Unlike the Terry Frisk, a consensual search is not considered a detention as the individual is free to leave at any time or can refuse to answer questions. Although law enforcement occasionally uses consensual search when permission is granted by a subject who is not yet a suspect, the more common and pervasive use case of consensual searches is to prevent unwanted items such as guns or alcohol from being brought into buildings, schools, sporting or other events, airports, voting facilities, court rooms, and other venues.

For example, when entering a sports arena, attendees are typically asked to consent to a combination of being scanned (e.g., by a metal detector) and being physically pat down as the hired security searches for improper items such as bottles of alcohol or weapons. This process is slow, error prone, cumbersome, and requires expensive manpower and equipment, all of which ultimately lead to a poor customer experience for the attendee.

Many of these venues are temporary (in non-permanent and dedicated facilities) requiring security be set up before the event and removed after the event. These events include festivals, religious events, polling and election events, concerts, and other temporary events. Security for these venues is of the highest priority for the event promoters and venue owners. Violence, riots, fights, or other problems can result in an impact in future ticket sales leading to significant reduction in revenue and potential litigation.

Airports, schools, arenas, and other large public buildings and spaces present areas of particular concern. Security at airports, for example, can include expensive equipment like millimeter wave scanners and backscatter x-ray scanners. The millimeter wave scanner is a large, fixed device sized and configured to allow a passenger to stand inside, with feet apart and hands over their head, while the device creates a full-body scan that is reviewed by a skilled operator. Backscatter x-ray scanners subject users to mutagenic x rays and can produce revealing full-body images of passengers that are embarrassingly and unnecessarily obtrusive, and need to be reviewed by a skilled operator.

Increasing number of venues have been declared as gun free zones. These venues include public spaces such as court rooms, education campuses, airports, government offices, stadiums, polling places, and other public spaces. Many of these venues employ detectors, generally metal detectors and X-Ray imaging equipment, positioned at specific ingress zones that are staffed with trained personal to operate the equipment, conduct bag and pat down searches, and manage visitors through the process. The challenge is that X-ray machine imaging technology is expensive, harmful to human DNA, and can only be used to scan for hand carried objects that can be placed in the scanner. Metal detectors are the most widely deployed systems employed to detect hidden body worn objects. The challenge is that metal detectors do not detect non-metallic objects and are very susceptible to false positives or false negatives. New technologies using synthetic aperture radar or SAR, such as the stand-inside scanning systems used in airports, provide high resolution imaging of hidden body worn objects, however, these systems are large, expensive, and require trained personnel to operate. The common factors in all of these devices that they exhibit one or more of the following traits: they can be expensive, bulky, slow, and often times dangerous in what they may not detect. Thus, a need exists for a handheld, portable, low-cost device that provides for contactless, non-intrusive, and accurate scanning for weapons or other banned objects, and that does not harm the subject.

SUMMARY

Embodiments of the present invention involve breakthrough innovations to revolutionize how both Terry frisks and consensual searches are conducted. Embodiments include imaging systems that are portable, hand-held, and high-resolution methods and devices that are capable of detecting objects hidden under, for example, people's clothing, or within a bag, or elsewhere. Using embodiments of the present invention, a user can safely conduct a weapons search without being in physical contact with the subject being searched.

Embodiments of the present invention use the novel approach to implement previously bulky and expensive devices on a single chip implementation used to provide the scanning and imaging functions in the LP. Embodiments of these innovations include components such as a low noise, high bandwidth Voltage Controlled Oscillator (VCO) to attain a center frequency exceeding 200 MHz (thus providing a frequency modulated continuous wave), a coherent mixer that improves receive sensitivity by 1000× over existing solution, and a full on-chip multi-element scanner that eliminates the need for external antennas or element arrays. Furthermore, embodiments include process innovations allowing these chips to include low-cost 55 nm CMOS or SiGe semiconductors, or other readily available processes.

Embodiments of the invention include a method or methods for concealed-object detection using one or more handheld, portable, battery operated, electromagnetic scanning apparatuses configured to operate at distance of two to ten feet. In an embodiment, the operator conducting the object search positions the subject to be scanned at a distance of up to approximately six to ten feet (or more) from the apparatus and initiates the scan. The apparatus emits non-visible electromagnetic radiation in the frequency band between approximately 0.1 to 1 THz as part of the scanning process. In an embodiment, the apparatus employs a phased array antenna in conjunction with a voltage controlled oscillator (VCO) to steer the emitted beam both vertically and horizontally to transmit electromagnetic radiation and deterministically illuminate the subject of the scan. Reflected electromagnetic radiation is received by an antenna on the apparatus and coherently mixed with the transmitted signal, allowing differential phase and amplitude information to be recovered. In an embodiment, the received signal is converted from time domain to frequency domain creating data that is used to produce an image. In an embodiment, the resultant image is further processed using a pattern matching algorithm (or a combination of algorithms) to identify objects within the field of view of the apparatus. The objects can be compared against a database of known objects and the operator is alerted in the case of a match.

In an embodiment, the apparatus is configured to show only suspicious objects on a representation of a subject's body, and not to provide any images of the subject's actual body. In an embodiment, the apparatus is configured to provide a visual representation of a suspicious object. In an embodiment, the apparatus is configured to display where on a subject's body the suspicious object can be found. In an embodiment, the apparatus is configured to provide an audible, visible, or mechanical warning that a suspicious object exists, thus allowing allow the searcher to keep their hands free during the scan. In an embodiment, the apparatus is used in a handheld mode. In an embodiment, the apparatus is used in a hands-free mode, and can be attached to the searcher's clothing or hung from the searcher's body, or attached to the searcher's equipment. In an embodiment, the apparatus can be attached to airborne or terrestrial vehicles, such as, but not limited to drones, automobiles, or robotic systems. In an embodiment, the apparatus can be used in conjunction with, or as part of, a body-worn camera. In an embodiment, the apparatus can be configured to be in communication with a network, and can upload both scanned data and metadata related to the scanned data, to a cloud-based or network-based system for further analysis and storage.

In addition to object detection, in embodiments, the apparatus can be configured to provide an image of a scanned subject's facial features even where the subject is wearing a mask or other clothing or covering. The resultant images can be subsequently used to determine the subject's identity either visually or through the use of a facial recognition system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof.

Figure 1:
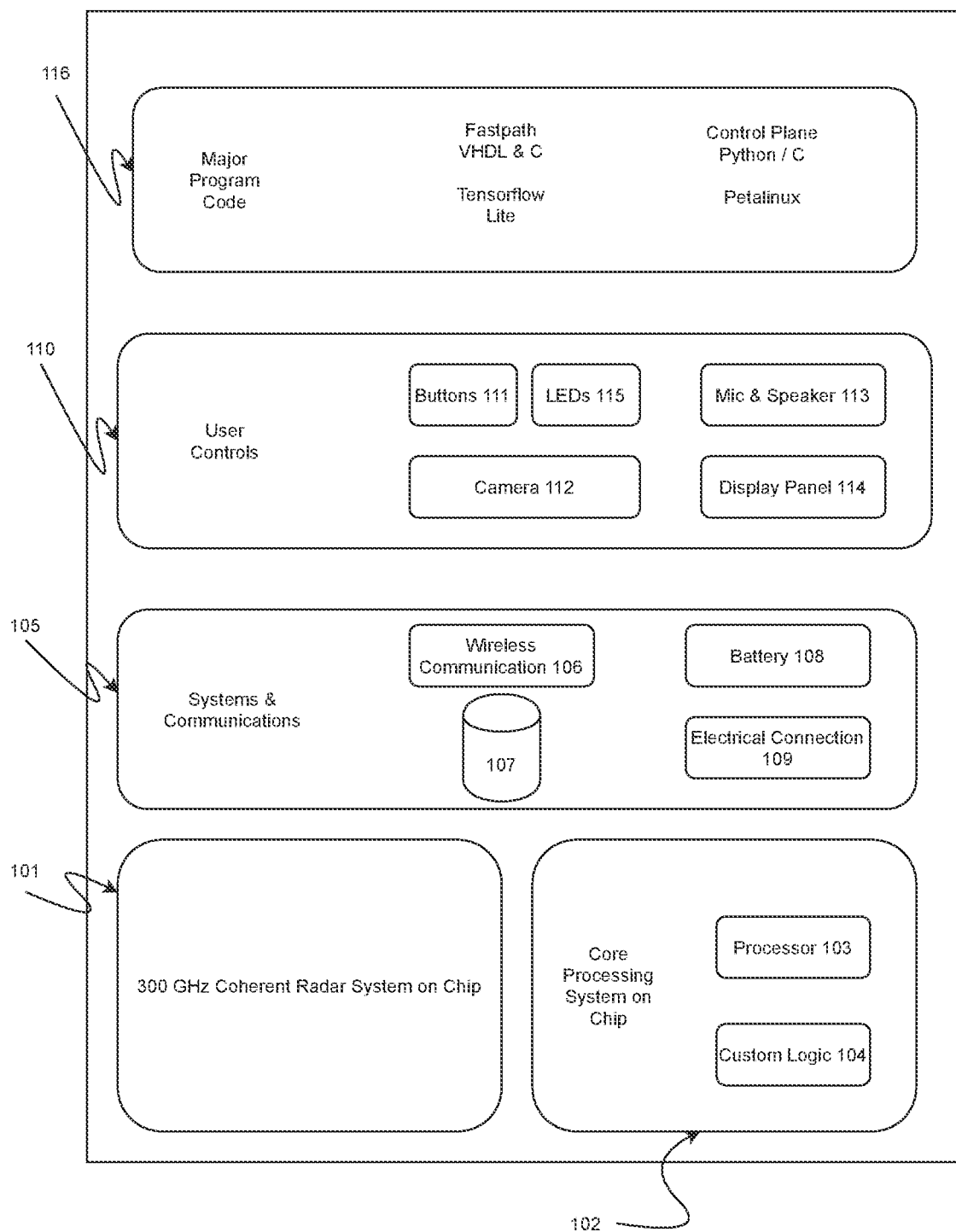
FIG. 1 is a block diagram of a system for providing a noninvasive imaging and detection system, according to an embodiment of the invention.

FIG. 1 is a block diagram of a system for providing a system for noninvasive imaging and detection. In an embodiment, the system comprises a coherent radar system on a chip 101, in communication with a core processing system 102. The core processing system 102 includes a processor 103 and custom logic 104.

The coherent radar system on a chip is configured to provide both range resolution and lateral resolution that is orders of magnitude greater than is found in the prior art. For a single radar chirp emitted by the chip, range resolution, which refers to the quantifiable distance to an object, is directly related to the bandwidth (fmax−fmin), where the available bandwidth is typically 5%-15% of the transmitted center frequency. Thus, the higher the center frequency, the higher the available bandwidth, and so the higher the ranging resolution. Because the chip is designed to operate in the THz range, the ranging resolution may be used to distinguish distances in the sub-millimeter range. The RSOC's size and single-chip configuration means that it can operate in a low power consumption mode, consuming power on the order of 10 watts or less, making it easy to provide power over an inexpensive Power Over Ethernet, connection. In an embodiment, power can be provided by a power adapter rather than a Power Over Ethernet connection.

Lateral resolution, on the other hand, relates to the quantifiable distance between samples of perpendicular cross section (e.g., side to side and top to bottom). In other words, lateral resolution relates to feature resolution of a scan. As the transmitted signal is swept across the target (i.e., the target is scanned), the resultant received signed is processed to show variations in reflectivity from the scanned target. These variations can be processed by using standard techniques such as, but not limited to, a Fast Fourier Transform (FFT) to produce an image. The feature size, or resolution of the image, is directly proportional to the wavelength of the emitted source where the shorter wavelength provides increased resolution. Another way to describe this is to say lateral resolution is a function of both beamwidth and steering. Beamwidth is a function of wavelength divided by antenna dimension. As the frequency of the beam increases, its wavelength decreases, and hence, the beamwidth decreases. In addition, the more antenna elements found on the chip, the larger the dimension, and thus the tighter the beamwidth. The tighter the beamwidth, the higher the resolution of distinguishing cross-sectional differences. Thus, in the THz range where the chip operates, the device can provide sub millimeter lateral resolution. Coherence is used to achieve high receiver sensitivity, and allows for recovery of the difference of frequency between transmit and source. This high receiver sensitivity is used to obviate the need for transmitting a signal on the order of >1,000× or 30 dB higher in power, which would not allow for a single chip implementation of the radar.

In an embodiment, core processing system 102 includes processor 103 and custom logic 104. Processor 103 is configured to process instructions to render or display images, initiate a scan, process the results of a scan, alert the user, and provide the results of an object match, if any, to the user. Processor 103 can be any of a variety and combination of processors, and can be distributed among various types and pieces of hardware found on the apparatus, or can include hardware distributed across a network. Processor 103 can be an ARM (or other RISC-based) processor. Additionally, such processors can be implemented, for example, as hardware modules such as embedded microprocessors, Application Specific Integrated Circuits ("ASICs"), and Programmable Logic Devices, including flash memory ("PLDs"). Some such processors can have multiple instruction executing units or cores. Such processors can also be implemented as one or more software modules in programming languagesas Java, C++, C, assembly, a hardware description language, or any other suitable programming language. A processor according to some embodiments includes media and program code (which also can be referred to as code) specially designed and constructed for the specific purpose or purposes. Custom logic 104 can include one or more Field Programmable Gate Array(s) (FPGA) or any type of PLD for custom logic to support processing offload from Processor 103.

In communication with coherent radar system 101 and core processing system 102, are the systems and communications circuits 105, comprising wireless communications circuits 106, Memory 107, power source 108, and an external electrical connection 109.

Wireless communications circuits 106 can include any practicable wireless communications circuits including, but not limited to, a wireless fidelity ("Wi-Fi") or wireless local area network ("WLAN") connection, a wireless wide area network ("WWAN") connection, a Bluetooth connection, an LTE/5G connection, and/or a cellular connection.

Memory 107 can be used to store, in computer code, artificial intelligence ("AI") instructions, a catalog of images, device configuration, an allowable, calculated, or predetermined user workflow, conditions for altering, device status, device and scanning configuration, and other metadata resulting from the scanning process. Memory 107 can be a read-only memory ("ROM"); a random-access memory (RAM) such as, for example, a magnetic disk drive, and/or solid-state RAM such as static RAM ("SRAM") or dynamic RAM ("DRAM), and/or FLASH memory or a solid-data disk ("SSD"), or a magnetic, or any known type of memory. In some embodiments, a memory can be a combination of memories. For example, a memory can include a DRAM cache coupled to a magnetic disk drive and an SSD. Memory 107 can also include processor-readable media such as magnetic storage media such as hard disks, floppy disks, and magnetic tape; optical storage media such as Compact Disc/Digital Video Discs ("CD/DVDs), Compact Disc-Read Only Memories ("CD-ROMs"), and holographic devices: magneto-optical storage media such as floptical disks; Solid state memory such as SSDs and FLASH memory; and ROM and RAM devices and chips.

Power source 108 can include any type of practicable battery, including but not limited to, Lithium-ion, Nickel Cadmium, Nickel-Metal Hydride, and alkaline. Power source 108 can comprise an external power source coupled to circuitry internal to the device. USB connection 109 can be used to put the apparatus in communication with a network, or can be used to provide an electrical connection to charge or power the apparatus.

In an embodiment, the apparatus further includes User Controls 110. User Controls 110 include user buttons 111 to manipulate the apparatus to turn the device on and off, to set the resolution, configure the device, or select a preconfigured setting, initiate a scan, initiate a connection with the cloud based service via one of the network interface (e.g., Wi-Fi, cellular, Bluetooth, or any other practicable interface) and control the camera functions. LEDs 115 can be used to provide feedback and information to the user about the state of the device, or about the results of a scan. Camera 112 is configured to capture optical images, and a microphone and speaker 113 are configured to facilitate communication, including communication to third parties, or communication with the device through voice or audio commands, and for the device to provide sound to the user such as one or more alarms or notifications. Display panel 114 can be an LCD or other type of display panel configured to display messages to the user, or to provide images representing the results of a scan.

In an embodiment, the apparatus comprises major program-code components 116 used to operate and control the device, which can include the computer instructions executed by the apparatus in performing a scan, and other functions of the apparatus. Program-code components 116 can include, but are not limited to, micro-code or micro-instructions, machine instructions (such as produced by a compiler), and files containing higher-level instructions that are executed by a computer using an interpreter. Program code can include hardware, software, firmware, and any practical way of coding. For example, an embodiment may be implemented using HTML, Java, C++, or other object-oriented programming language and development tools. Additional examples of program code include, but are not limited to, control signals, encrypted code, and compressed code. Major program code can include, but is not limited to, a standard operating system (e.g., Linux), hardware drivers for software-managed hardware elements, machine-learning inferencing, image processing, image storage and retention, cloud-service interface, scanning process, user interface, device management, cryptographic functions, user access management, and device health.

Figure 5:
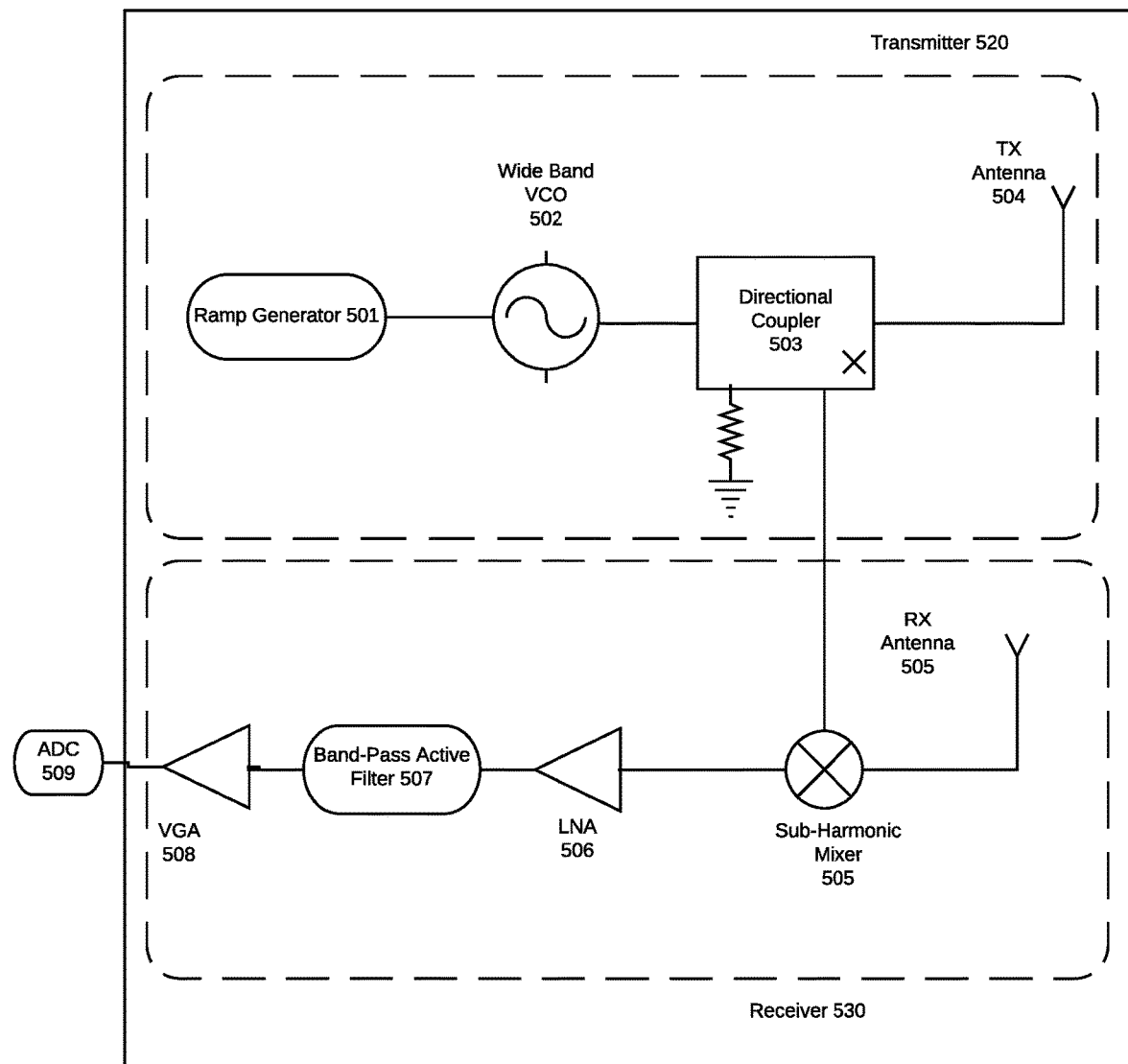
FIG. 5 is a block diagram of a schematic for a radar system on a chip (RSOC), according to an embodiment of the invention.

FIG. 5 is a block diagram for a schematic of a radar system on a chip (RSOC) used in an apparatus, according to the present invention. Notwithstanding anything else in the application, one skilled in the art will understand that the RSOC includes all the elements described with regard to FIG. 5 on a single chip (with the exception of ADC 509, addressed below). Generally, the RSOC transmits the RF signals via TX antenna 504, and receives the reflected signal via RX antenna 505, to produce a baseband analog signal that is digitized by an external analog-to-digital converter (ADC 509) and processed by digital processing logic and a CPU to product a visible image of the scanned target. The RSOC consists of two major functions: 1) A transmitter that produces the radar signal and initiates the scan and 2) a receiver that receives the reflected signal and recovers differential phase and frequency information, and provides that information to the digital processing system.

In an embodiment, Transmitter 520 consists of 4 major functional components: Ramp Generator 501, Wide-Band Voltage Controlled Oscillator (VCO) 502, Directional coupler 503, and a Phased-array element array 504. Ramp generator 501 is configured to provide a voltage signal to Wide Band VCO 502, which controls the center frequency of the VCO nominally centered between approximately 0.1 to 1 THz. Ramp Generator 501 is configured to move the center frequency of Wide Band VCO 502 over a predetermined frequency that creates a frequency sweeping action, a frequency modulated continuous wave, to produce the radar scan. Ramp Generator 501 can generally produce a sawtooth voltage waveform, however, other waveforms such as ramp, sinusoid, flat, or combinations thereof, may be employed as well. The Wide Band VCO 502 can be is implemented to produce low phase noise, thus improving the receiver's receiver sensitivity. The signal from Wide Band VCO 502 can then be provided to Directional Coupler 503, which can create at least two coherently related identical versions of the input signal. One of the two versions of the input signal is provided to the sub-harmonic mixer as a coherent reference, and the other version of the input signal is provided to the phased array element antenna. Each element in the system acts as an antenna and employs a phase-locked oscillator coherently related to the signal from Wide Band VCO 502 to ensure a fixed phase relationship from adjacent transmitting elements, which can be used for, for example, to attenuate unwanted side lobes. The RF energy produced by the elements is focused using an external radar lens (not shown), generally implemented as a hemispherical component of radar transmissive material, to scan the target and create the reflected RF energy to be received by Receiver 530.

Receiver 530 consists of 5 major functional elements: 1) Receive Antenna (RX Antenna) 504; 2) Sub Harmonic Mixer 505; 3) Low Noise Amplifier (LNA) 506; 4) Band Pass Active Filter 507; and 5) Variable Gain Amplifier (VGA) 508. Receive Antenna 505 is configured to receive the reflected RF signal broadcast by the transmitter and reflected from the target. RX Antenna 504 may be implemented as a dipole antenna, or by any other practicable antenna configuration. The signal received at RX antenna is provided to the sub-harmonic mixer, which can then create sum and difference frequencies based on the reference signal provided by the transmitter. The sum and difference frequencies are coherently related, and enable the receiver to recover differential phase and frequency, thus improving the noise figure of the receiver by approximately 10,000× (or 40 dB) as compared to traditional non-coherent receivers. LNA 506 is used to amplify the signal as required by Band Pass Active Filter 507. Band Pass Active Filter 507 filters off undesirable harmonics created by the Sub-Harmonic Mixer 505. The term 'active' refers to the use of active elements to include linearly biased transistors in conjunction with reactive and passive elements to provide the bandpass filter with minimized or reduced noise and phase distortions of the passed signal. VGA 508 receives the signal from band-pass filter and amplifies and provides the necessary impedance matching for external ADC 509. In an embodiment, ADC 509 is implemented functionally on the RSOC. In an embodiment, ADC 509 is implemented external to the RSOC.

Figure 2:
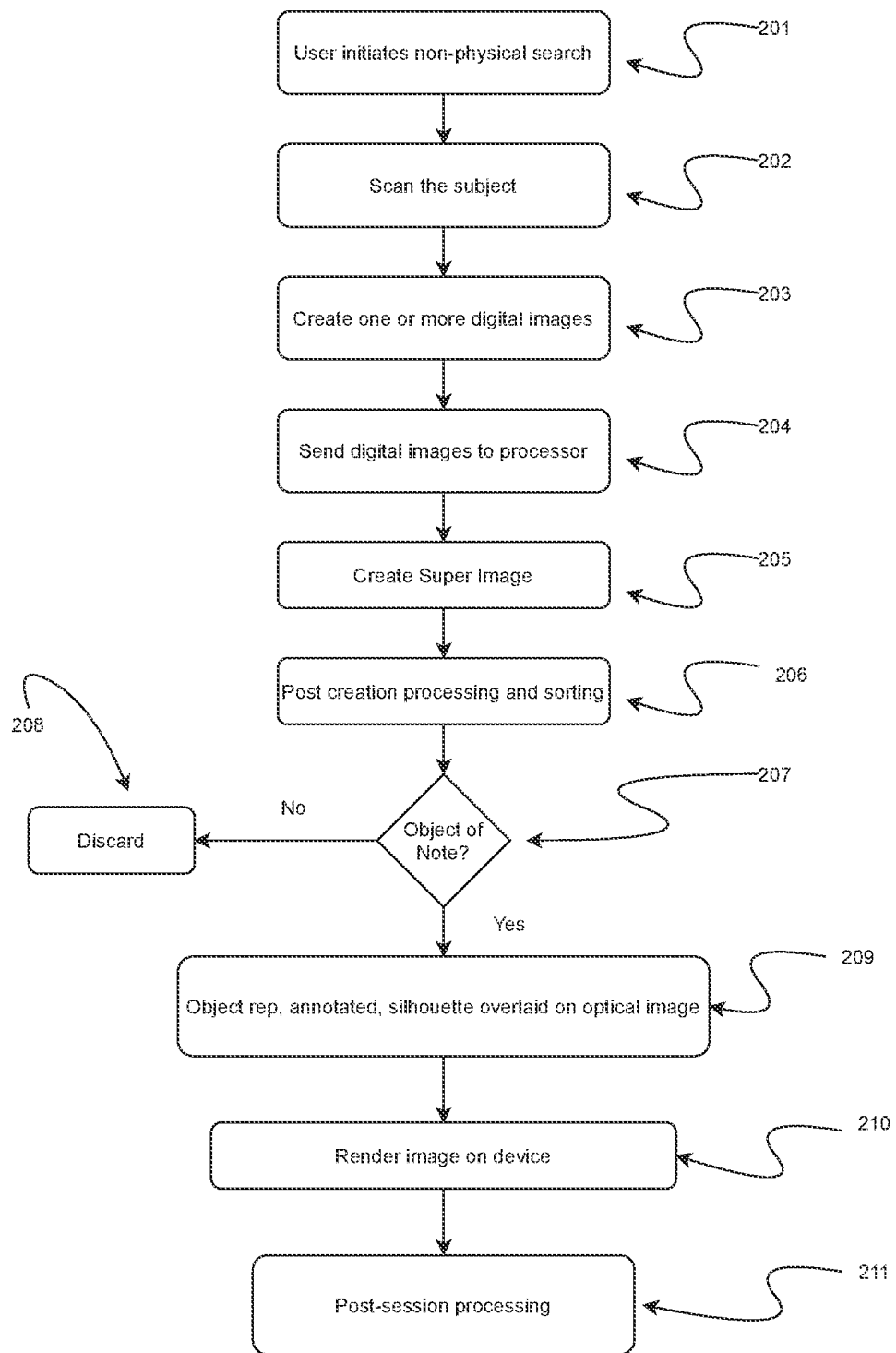
FIG. 2 is a flow chart of a process for noninvasive concealed-object detection, according to an embodiment of the invention.

FIG. 2 is a flow chart of a method for using a non-invasive scanner for creating images useful for imaging and detection. Prior to use, in an embodiment, the apparatus will have, and will be in, one of a set of operational modes and or states, including a low-power or standby mode, a synching mode, and an off mode. A user can generally tell, based on the apparatus's display, whether the apparatus is in an operational mode or not. In an embodiment, the apparatus will be able to show the local user which state the apparatus is in, via LEDs, local LCD panel, or using an audible warning. If the apparatus is in an off mode, then the apparatus is powered off and does not perform any scanning. In an embodiment, the apparatus can be in a state that requires user interaction to set up the apparatus in sync mode and connect it to an online network for backup and additional functionality such as uploading data and metadata. In an embodiment, the apparatus can be set to sync automatically through the online network.

In sync mode, the apparatus can send and receive operational control parameters such as a cryptographic device key for device or user login to the system, user-configuration data detailing, for example, who is using the apparatus, what organization or department the user belongs to, updates to the machine-language inferencing engine, relevant (e.g., user or departmental) policies and controls, including general policies on alert, event, and trigger actions. In addition, the operational control parameters can include information detailing how full the device disk is, and whether upload is required. In an embodiment, the machine-language inferencing engine is the process that performs the object pattern matching and subsequent identification. In an embodiment, it can be implemented in software and accelerated using and FPGA. In an embodiment, it can be implemented in hardware. In an embodiment, it can be implemented in any practicable combination of hardware and software.

In the low power or standby mode, in an embodiment, the apparatus is operational and ready for use. In an embodiment, network access exists, along with a live connection to any related network services. In another embodiment, no network access exists. The apparatus can include sufficient local storage and processing power for operating independent of a network. The apparatus can further include a timer along with a device key to allow a user to use the apparatus as long as the timer has not timed out, thus ending the user session on the apparatus.

In embodiments, other modes that can be used by the apparatus include active-target-acquisition mode, and active-non-physical-search-in-process mode. In active-target-acquisition mode, the apparatus will show or relate the field of view to the user with an active camera and preparing to go to state 5. State 5 defines the system being in the active state of a non-physical search. In this state, the apparatus imaging system pipeline and real-time alerts and notifications are active.

In an embodiment, if the device is ready for use, then at 201, the user initiates a non-physical search of a subject. In an embodiment, the initiation of the non-physical search can begin with a user setting up a subject between 5 and 10 feet away from the apparatus. The subject can then be asked to look at the user and/or the apparatus. The user can then point the apparatus toward the subject and turn on the scanning function of the device via a button, trigger, voice control, or other control switch.

At 202, in an embodiment, the apparatus scans the subject. To do this, in an embodiment, the radar system on a chip generates a radar signal and sweeps a predetermined field of view, emitting a radar signal in the 0.1 to 1 THz range. The apparatus employs a phased array antenna in conjunction with a voltage controlled oscillator (VCO) to steer the emitted beam to transmit electromagnetic radiation and deterministically illuminate the subject of the scan, according to an embodiment. To complete the scan, the emitted signal interacts with the subject, and a certain amount of the electromagnetic radiation is reflected back and received by an antenna on the apparatus. The received signal is coherently mixed with the transmitted signal allowing differential phase and amplitude information to be recovered. In an embodiment, the transmit signal is combined, or mixed, with the returning signal allowing for recovery of frequency and phase information in the receive signal.

At 203, in an embodiment, the analog signal from the scan is converted to a digital format using one or more analog-to-digital converters (ADCs) to create a digital image that can be forwarded to the processing complex of the apparatus. In an embodiment, the process of scanning and creating an image can be repeated a predetermined number of times (programmed into the apparatus or selected by the user) creating multiple digital images.

At 204, in an embodiment, the multiple images are sent to the processor, and in 205, the multiple images are combined in the processor to form a super image to enhance resolution, creating a super image. The steps of this super imaging process are detailed in FIG. 3, discussed below. At 205, the feature resolution of the image is enhanced, thus improving the chances for object recognition in 206.

Once the post creation processing and sorting has been performed at 206, a determination is made at 207 as to whether an object of note is found. If an object of note is not found, the image and its corresponding data can be discarded. If an object of note is found, then at 209, the object of note is superimposed as an outline over an outline of the scanned target, and at 210, the final image is presented to the user. The image can be rendered on a screen on the device. Optionally, the image can be rendered on a smartphone or other mobile device. When rendered or displayed, the image can contain the original visual image of the target with representations of objects found. The multiple images can also be combined to create a video stream. And because the scanning process provides ranging information, the device can provide a three-dimensional rendering of the image. In an embodiment, different colors are used to indicate the threat level of the detected object. As an example (but not the only example), a red outline displayed on the apparatus can indicate the presence and position of a gun. As another example (but not the only example), a green outline can be used to indicate the presence of keys, or some other equally innocuous object.

In an embodiment, an image of an identified object, or a representation thereof, can be superimposed of a representation of the scanned target. In an embodiment, the representation can be an outline of the scanned target, e.g., a generic outline of a human form, over which the image representing the identified object can be placed, providing the user with information about the positioning of the object on the subject's body, in addition to detailing the threat level of the object. In an embodiment, the representation of the scanned target can take the form of a variety of zones displayed on a screen positioned on the apparatus, or on a mobile device in communication with the apparatus.

Upon completion of a search, at 211, post-session processing takes place. This processing can include all or some of the following: tagging images or videos with metadata, gathering and uploading metadata, generating a report, providing a digital signature or certificate, archiving, and uploading the data (both received and processed) and metadata. In this step, images can be cryptographically tagged with various metadata and transmitted and stored on the device, or can be uploaded for further processing. If a data repository is used (e.g., a cloud-based database or an online server), the images, videos, and metadata can be stored there. Examples of metadata can include (but are not limited to) time stamps, geolocation data, device data, customer specific information (user, associated visual images), networked or connected devices, voice recordings, and session information. In an embodiment, a web-based service can be implements using public cloud infrastructure and services such as those provided by (but not limited to) AWS, Azure, and GCP.

Figure 3:
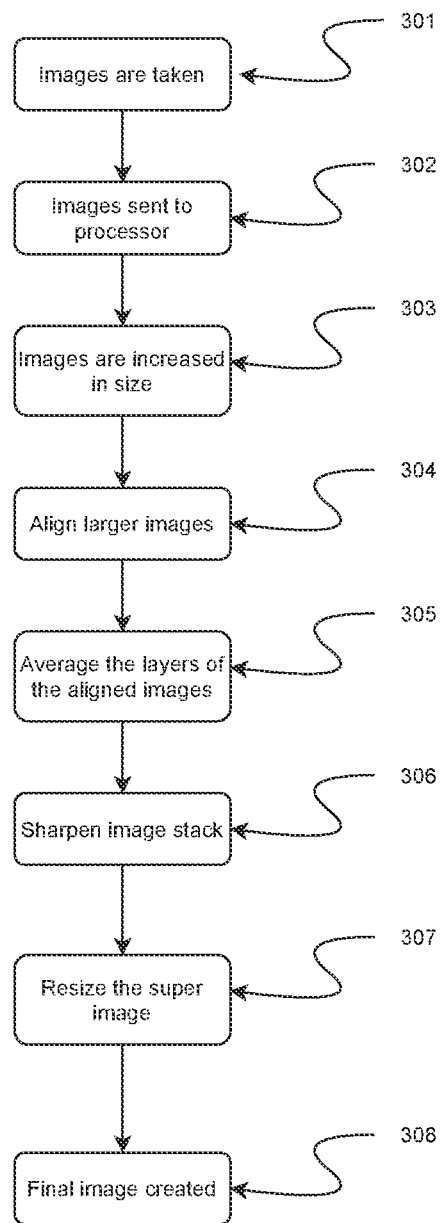
FIG. 3 is a flowchart of a method for creating a dataset from images taken by a non-invasive scanner, the dataset being appropriate for post processing and use in imaging and detection, according to an embodiment of the invention.

FIG. 3 is a flowchart of a method for creating a dataset of images to be used for imaging and detection, according to an embodiment. At 301, one or more images are taken. At 302, the images are sent to a processor for processing. The image or images received at the processor are in increased in size by a predetermined amount creating a set of larger images, at 303. In an embodiment, the images are increased in size to achieve finer blending of the image stack in order to extract the high frequency data that is embedded in the low frequency data hidden in the aliasing.

At 304, at least a subset of images in the set of larger images are aligned, according to an embodiment. In an embodiment, at 305, the layers are averaged with linear opacity 1, 0.5, 0.25, 0.125, and so on, allowing images, in an embodiment, to be blended evenly, making use of the aliasing.

At 306, in an embodiment, the image stack, the plurality of images being combined, is sharpened using a predetermined radius. At 307, according to an embodiment, the final super image is resized. One skilled in the art will understand that the output can be resized to any desirable size using any practicable resampling method that provides an appropriate image. At 308, the super image is used to create the final image (seen in 206 from FIG. 2). Once the super image is created, the image is further processed, as detailed in FIG. 4, discussed below.

Figure 4:
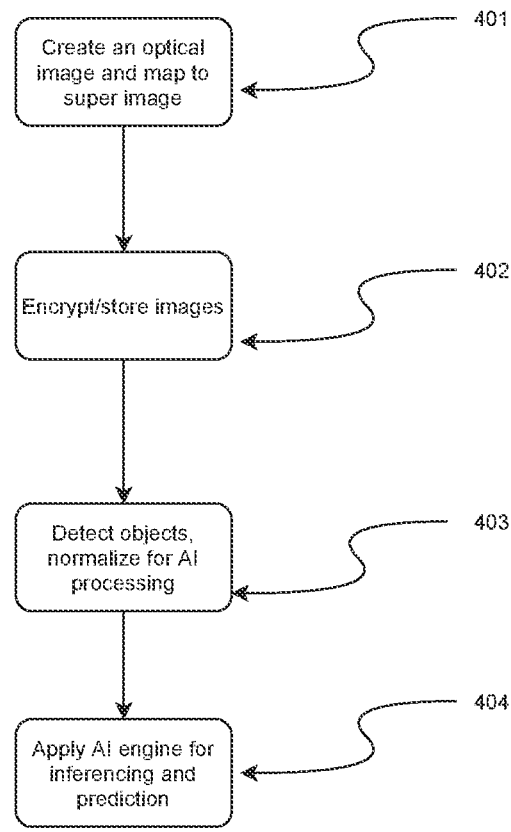
FIG. 4 is a flowchart of a method for processing a final image, according to an embodiment of the invention.

FIG. 4 is a flow chart of a method for processing the existing data to create a final image. At 401, an optical image is created and mapped to the super image creating a filtered image. In an embodiment, the apparatus uses a separate camera to create an optical image used as a base image configured to be mapped to the super image, according to an embodiment. In an embodiment, the separate camera is a digital camera using a CCD sensor, or a CMOS sensor, or any practicable sensor.

At 402, in an embodiment, the filtered images are encrypted, while the unfiltered image data is discarded. One skilled in the art will understand that the encryption can be performed using SSL or TLS secure encryption, or any practicable encryption. In an embodiment, the apparatus stores some or all of the filtered image locally. In an embodiment, the apparatus stores some or all of the filtered image in a backend cloud service where it can be archived or undergo additional processing, or both.

At 403, in an embodiment, the super image is analyzed to determine whether any objects of note are present on the subject, and if so, the super image is normalized for processing. In an embodiment, normalizing the super image means preprocessing it into a format, or with information, appropriate to feed an artificial intelligence system. This preprocessing can include (but is not limited to) scaling to a fixed width and height, conversion of the bit depth, shifting and or rotation of image. The processing can be performed by an artificial intelligence (AI) system.

The device containing the RSOC can be equipped with local processing subsystem, such as a CPU, a memory, and other components configured for local image processing and/or weapons classification. To save cost and power, the local processing subsystem may not be present, or may not be active, and the raw scan data is transmitted to a Central Management Application, or CMA, via a network connection. In in embodiment, the CMA performs the image processing and weapons/object classification process. It also provides a repository to store image data, results, and scan metadata. The CMA also provides centralized management of the devices for remote management including device provisioning, device health status, event status, software updates, and device operations.

At 404, once the objects have been normalized, the resultant image is transferred to an AI engine for pattern matching against known threats and then calculating the likelihood that the input data is a threat. As part of the image processing, in an embodiment, the apparatus performs an image search to match detected shapes against a prebuilt local image threat library, or a mathematical model representing such images, and makes a threat determination using parameters such as shape type, size, type of weapon, confidence level, contrast, and other parameters. Entries in the threat library can include some or all of the following: guns, knives, bombs and bomb vests, clubs, truncheons, bottles, and other objects of interest. In an embodiment, once a preliminary determination has been made that a weapon is suspected, the apparatus will focus in on the suspected weapon(s) and providing better image resolution to improving the detection confidence. In an embodiment, privacy filtering processing is applied, thus ensuring all locally storage body images are obfuscated as part of the image processing described in FIG. 3.

In an embodiment, the polices and control of the apparatus, the chip, and the general system, can be configured and controlled by a hierarchical set of domains allowing for different domains to grant configuration control to subordinate domains. In an embodiment, the policy and configuration control can be separated from the users of the device to ensure compliance, operational procedures, and in general simplicity of use. In an embodiment, the policy and configuration control can be performed and input by a local user. In an embodiment, the policy and configuration control and be performed and input using an AI system.

Users can configure policies and alerts for different actions, and to provide feedback in different forms. In an embodiment, alerts can be visual (e.g., providing an outline of an object on a screen). In an embodiment, alerts can be audible (e.g., emitted by a device speaker or through an ear-piece). In an embodiment, alerts can trigger or prompt a user for additional actions of a remote device (e.g., via call to API), or other user defined actions.

In general, an event that triggers a display or alert of an unwanted object (as examples) can combined with, and work with, other events using, for example, Boolean logic to form complex triggers. Examples of triggers can include: More than two unidentified objects were found that were larger than a predetermined size. Events can include but are not limited to: an object is identified via machine learning with a predetermined probability; a person is identified via facial recognition, within a predetermined probability; an object of size greater than a predetermined size is found but not identified; an object of size smaller than a predetermined size is found but not identified; a search took place at a certain time of day, or within a certain range of times; and/or whether a contactless Terry Frisk is required; and any other event that can trigger an action.

Examples of alerts and controls can include: logging an event locally or in the cloud; logging an event in the cloud in either real time or in a batch upload; alerting a user with local audio, vibration, light or local display; alerting a user via a headset, earbuds, glasses, or any other remote device; texting to one or more mobile phone numbers or sending an alert to a mobile app; emailing an alert to one or more email addresses; providing a suggestion to a user on what a next step is for them to take, in addition to the alert itself; communicating to other contactless search devices as a remotely generated event; and calling a custom remote API, which can prompt some other action such as unlocking or locking a door, turning lights on or off, or any other customer-defined action.

One skilled in the art will understand, in the context of embodiments of the invention, that the term "a combination of" includes zero, one, or more, of each item in the list of items to be combined.

For the purposes of the present invention, the term computer program or computer code includes software, firmware, middleware, and any code in any computer language in any configuration, including any set of instructions or data intended for, and ultimately understandable by, a computing device.

One skilled in the art will understand that the order of elements described in each figure is given by way of example only. In an embodiment, the order of elements performed can be changed in any practicable way.

In some embodiments, the processes in FIGS. 2-4, or any portion or combination thereof, can be implemented as software modules. In other embodiments, the processes in FIGS. 2-4 or any portion or combination thereof, can be implemented as hardware modules. In yet other embodiments, FIGS. 2-7, any portion or combination thereof, can be implemented as a combination of hardware modules, software modules, firmware modules, or any form of program code.

In the case where one desires to detect concealed objects (or objects that are otherwise not in direct line of sight, such as concealed body-worn weapons) in a predetermined area such as an entryway to a public building, or a hallway in a school, a device called a Hall Monitor ("HM") can be used. The HM is analogous to the handheld device, containing or is otherwise in communication with the components described above, but is intended to be fixed to a wall, ceiling, or fixed mount to monitor a specific predetermined area. The RSOC can be attached to the HM, which is deployed as a small device that can be approximately the size of a commercially available fixed mount IP camera. The radar scanning function is configured to detect hidden body worn or carried objects and to automatically provide an alert if a threatening object, such as a weapon, is identified. The HM can also alert on other types of impermissible objects as well, including components and items not allowed to leave, or be brought into, a building area. For example, concealed inventory components being stolen from a manufacturing floor could be considered impermissible objects. In these cases, the HM, in addition to alerting, provides visual representations or images of the detected objects.

In the case that multiple individuals are detected, the HM will identify multiple targets and perform the scanning operation on each target. The HM may also scan the target multiple times to improve resolution of the imaging process increase the confidence of the weapons detection process.

Figure 6:
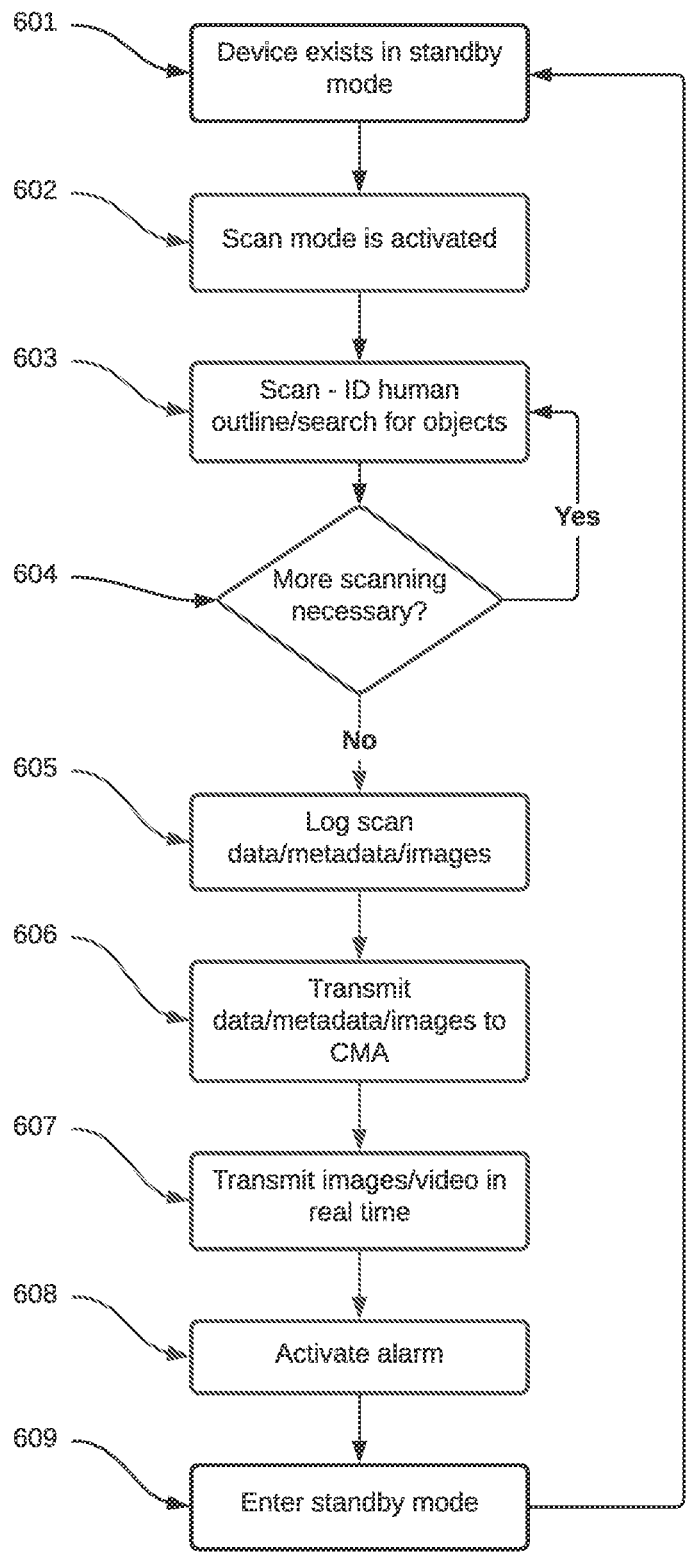
FIG. 6 is a flowchart of a method for an RSOC to scan a predetermined field of view, according to an embodiment of the invention.

FIG. 6 is a flowchart of a method for an HM or other system containing an RSOC to scan a predetermined field of view, according to an embodiment of the invention. The RSOC can be mounted in a housing similar to currently available housing for video devices that surveille building interiors, and can be mounted vertically (e.g., on a wall or post) or horizontally (e.g., on a ceiling), on any stable fixed mounting location that covers the desired area of coverage.

In an embodiment, at 601, the HM exists in standby mode, essentially waiting for aa signal to turn on and begin the detection process. As a person (or people or object(s)) enters the HM's field of view, an initial detection event occurs such that the HM detects an object (e.g., a person) entering its field of view or another predetermined area, identifies the target to be scanned, and initiates the scan. Thus, once the initial detection event occurs, a signal is sent to the RSOC to activate the device's scan mode, at 602. A detection event can include motion detected in the device's field of view; a sound detected within the audio reception distance of the device, a predetermined time or event occurring, a signal received from an external source or others. Various ways exist in which the HM can detect motion. Generally, the target can exist in scanning mode, and upon a target (or potential target) breaking the plane of the scan, the HM scans the target and characterizes it as human. For example, the HM can visually detect motion, or visual changes in its field of view, using the IP camera. The HM can use AI to determine that a person is within the field of view, and once this determination is made, the HM can initiate the scan process. In another embodiment, the RSOC chip can be placed into a continuous scan mode and then detect either motion in the field of view or detect a human outline using AI. In another embodiment, other sensors such as a microphone can be used to detect sounds consistent with a person (talking, walking, etc.). Two or more microphones could be used to help triangulate direction of the sound and activate the appropriate RSOC for a scan.

In another embodiment, a scan is manually activated by an operator who may observe a person or persons entering an area by visual images from the IP camera.

In any embodiment, the sensitivity of the detection algorithm can be tuned by an operator to optimize performance for a specific environment. For example, in the case where a lot of ambient noise exists, the threshold for sound detection may be raised, allowing the device(or an operator) to better discern human noises from background noise. In the case of detection of a human outline, the thresholds for the detection algorithm can be raised or lowered to increase or decrease sensitivity. The higher the threshold, the higher the confidence is required from an AI detection process, thus lowering the chances of false positives, but possibly raising the changes for not detecting a person The opposite occurs when lowering the threshold. Once motion or a person is detected, the scanning process is initiated.

At 603, the RSOC scans a target and searches for objects, as discussed above. In an embodiment, such target can be a human being, or the outline of a human being. In an embodiment, the HM is capable of scanning over a maximum angle that is fixed both horizontally and vertically, thus providing an effective scan area or field of view that is smaller or larger depending on the distance from the HM. For example, at 5-7 feet from the target, the radar may be able to image a field of view approximately the size of a 6.5 ft×6.5 ft target. At 20 feet, this field of view can be much larger, and the HM can dynamically narrow the scan angle to reduce the spot size, thus improving lateral resolution (image feature resolution), and also mitigating degradations to the link margin over the greater distance.

In an embodiment, the HM's ability to narrow the sweep angle can be used to zoom in on a suspected object and provide enhanced resolution. In other words, the scan angle can be reduced to increase the scan range, thus increasing scan distance. For example, the HM may conduct a full body scan and then perform a subsequent "zoomed in" scan on individual objects, using narrower sweep angles for enhanced lateral resolution. In an embodiment, the "zoomed in" functionality can improve the imaging and/or the weapons/object classification system. In another embodiment, the HM can increase lateral resolution, thus improving object image resolution. This technique can be used, for example as a target comes into range of the HM. An initial scan can be performed to detect objects, while a subsequent scan or scans can be performance with a reduced sweep angle to effectively zoom in on objects and provide better image resolution.

Once the target is scanned, then at 604, the device determines, by itself or using a remote processor, whether it has enough information for the processor to make a determination about whether the target contains a weapon or other improper object, or whether more scanning is necessary. If the Hall Monitor is unable to resolve the image, then the device continues to scan the target until a predetermined data threshold is met such that more scanning is not necessary. In an embodiment, the processor making the determination physically connected to the HM. In an embodiment, the processor making the determination is in communication with the HM but not physically connected to it. In an embodiment, a combination of local and remote processors is used to make the determination about whether the target contains a weapon or other improper object.

If the device determines that no more scanning is necessary, then at 605, the data, metadata, and images that resulted from the steps of the scan are logged, and at 606 transmitted to a central management area (CMA). The images can be logged on the device, or by the CMA, or both.

At 607, the still and/or video images are transmitted in real time to the CMA for use in an AI engine, and can also be used for evidentiary purposes. In an embodiment, at 608, the device can send a signal triggering an alarm alerting officials or officers that an impermissible object has been found. In an embodiment, the alarm is triggered in the vicinity of the target. In an embodiment, the alarm is triggered in the vicinity of the CMA or of an officer or agent. Once a weapon is detected, security personnel can be called in take appropriate actions based on the organization's security policies. In an embodiment, the CMA can be a cloud- or server-based application employing various software components to automate detection of objects, store evidentiary data provide an interface to view the stored image data, and can include security mechanisms to protect the data against unauthorized access or use.

At 609, the device can receive a signal to reenter standby mode. The signal sent to the device to reenter standby mode can be based on the target leaving the device's field of view, and can be sent remotely, as in from a CMA, or can be sent from the device's own circuitry once a determination that the scanning is no longer needed. The signal can also be sent manually from a CMA, or from another RSOC-based device. Once in standby mode, the device is ready to be used again to scan its field of view.

The discussion above can be read in the context of detecting an impermissible object, such as a weapon, but targets ca be scanned for other types of objects. For example, a venue operator may want to prevent customers from bringing bottled drinks into the venue. In that case, the HM would alert on the presence of a bottle shaped object and the venue security operations staff could then take appropriate measures per their security policies. Another example is an Enterprise that wants to protect against exfiltration of intellectual property. In this case, the HM would scan employees prior to exiting the work area to detect hidden objects such as paper files, USB devices, production inventory, or other objects impermissible for employees to carry off premises. An extension of this example would be for secure environments where strict limits exist on what objects can or cannot be brought in and out of the secure area.

Figure 7:
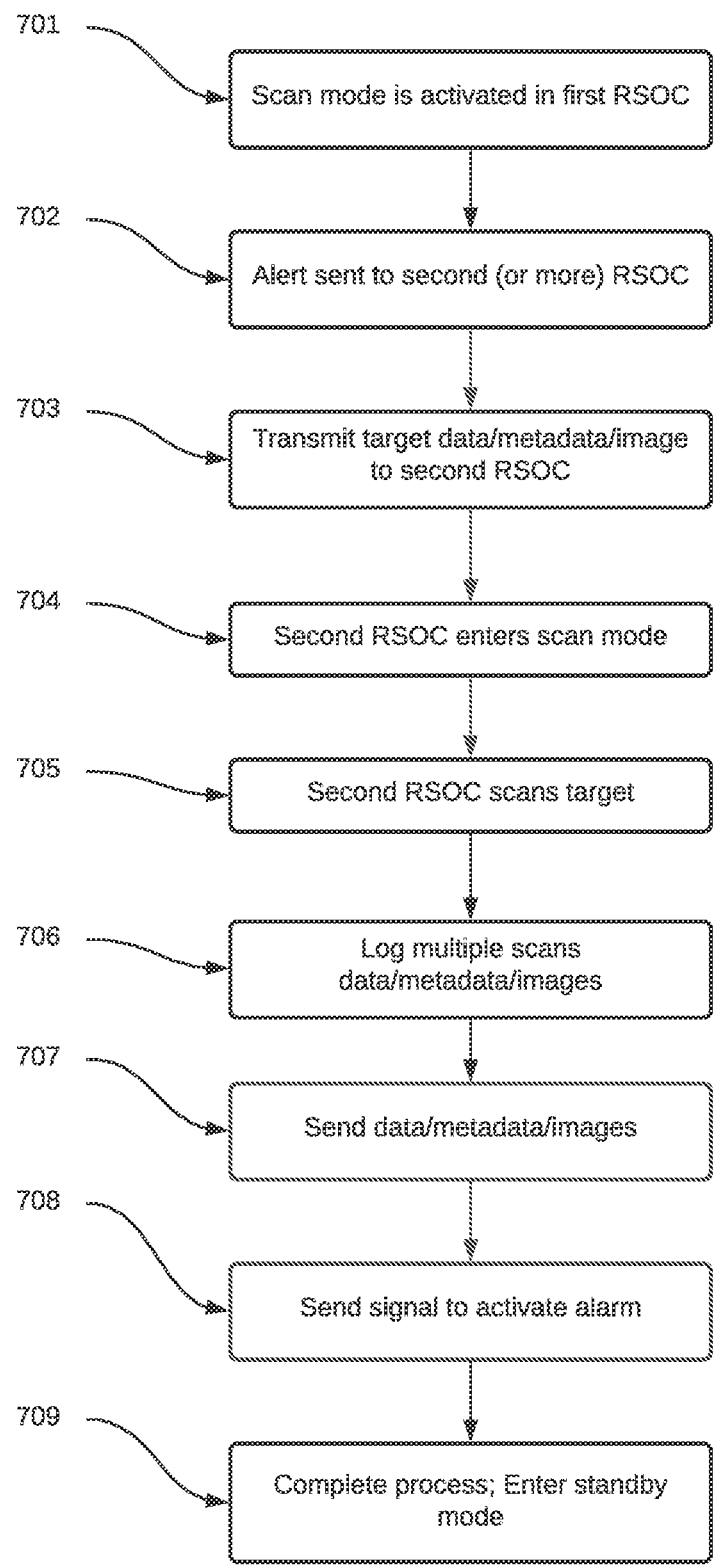
FIG. 7 is a flowchart of a method for multiple RSOCs to scan one or more locations, according to an embodiment of the invention.

FIG. 7 is a flowchart of a method for multiple RSOCs to scan one or more locations, according to an embodiment of the invention. Examples of the use of multiple RSOCs can include having different RSOCs monitor multiple locations simultaneously, or having a multiple RSOCs monitor a single target from different directions or orientations. Because an RSOC scan does not penetrate human bodies sufficiently to create a three dimensional image with a single scan, an HM device is only able to scan one side (e.g., the front) of a target as the target approaches the HM, and then a second RSOC can scan the back of target as it moves away from the HM. Thus, to cover multiple angles with the same HM, multiple RSOC radar imaging subsystems may be employed. Another example of an embodiment applying multiple scans can be an HM with four radar imaging sensors aimed 90 degrees apart so that they could be used at an intersection of two intersecting (in this case, perpendicular) hallways, allowing for full front and back scans of targets moving in any direction down the two halls. Likewise, multiple HMs could be placed in a hallway at fixed intervals, or in different hallways, to provide the same capability.

In general HMs can be attached to walls or ceilings, or can be mounted on a stand, or in any way practicable that allows for scanning an area with a field of view that is roughly five to twenty feet from the HM (as measured in a straight line from the center of the RSOC lens to the centroid of the target being measured).

At 701, a scan mode is activated in a first RSOC, and at 702 a scanner alert signal is sent to a second RSOC. In an embodiment, the scanner alert signal is sent to a plurality of RSOCs. Once the first RSOC begins the scanning process, it transmits a predetermined combination of target data, metadata, and images (both still and video) to the second (or other) RSOCs at 703.

At 704, upon receiving the scanner alert, the second RSOC enters scan mode, and then at 705 the second RSOC scans the target in its field of view. In an embodiment, the second RSOC scans the same target as the first RSOC. In an embodiment, the second RSOC scans a different target as the first RSOC.

The data, metadata, and images from the multiple scans are logged at 706 and sent to a CMA at 707. If certain conditions are met (e.g., a weapon is detected, or a threshold number of bad actors are detected), a signal is sent to activate an alarm at 708. In an embodiment, the signal can be sent manually from the CMA. In an embodiment, the signal can be sent automatically if certain policies or conditions are met, as determined by a processor on the HM, or by a processor at the CMA.

Once the HM has determined that the target has left its field of view, or once the HM receives an external signal with instructions to enter standby mode, at 709, the RSOC is once again placed into standby mode to await the next signal enter scanning mode.

Figure 8:
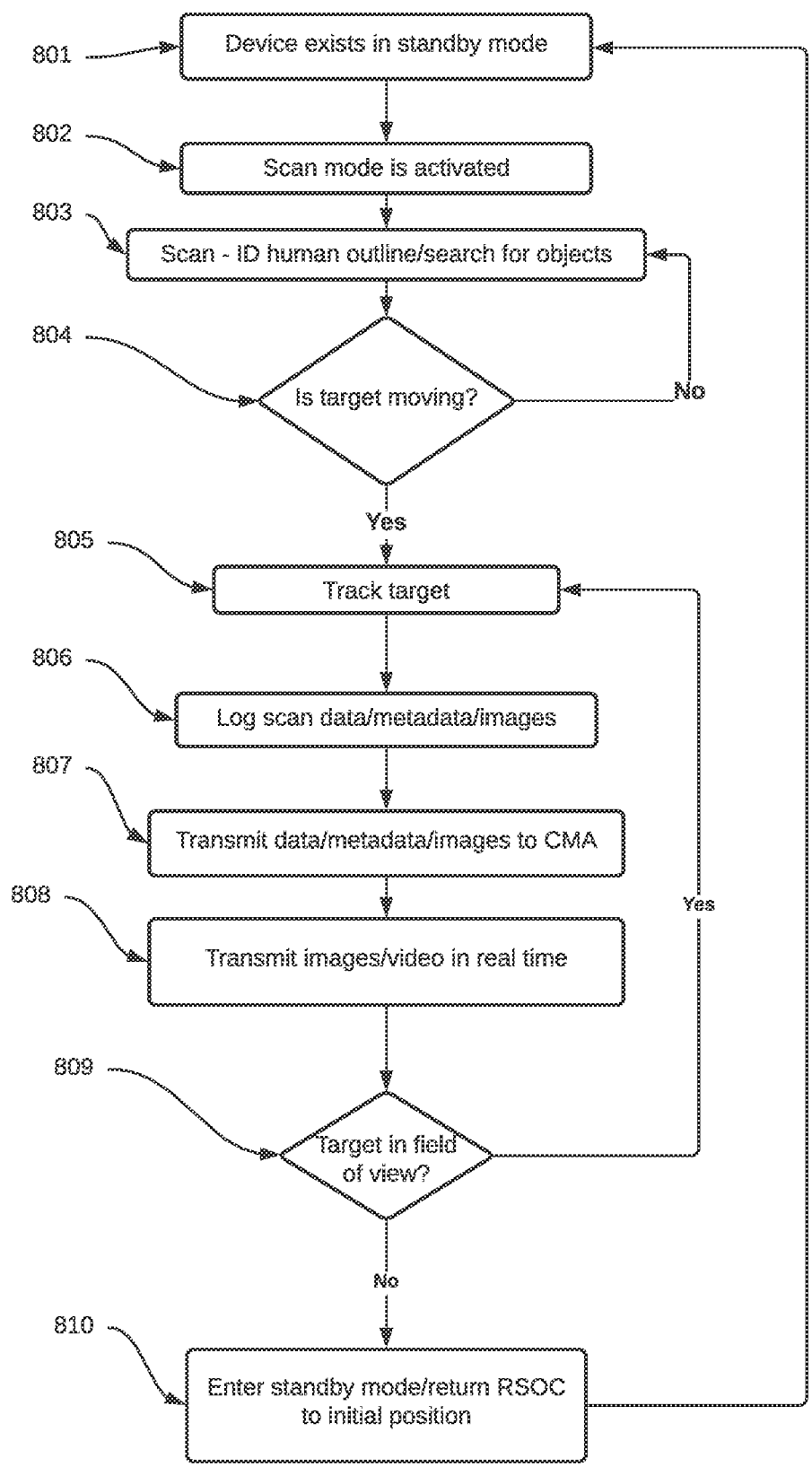
FIG. 8 is a flowchart of a method for using an RSOC capable of tracking a target through a field of view without the need for multiple devices, according to an embodiment of the invention.

FIG. 8 is a flowchart of a method for using an RSOC capable of tracking a target through a field of view without the need for multiple devices, according to an embodiment of the invention. A single HM can be mounted on a wall, ceiling, or stand, in a way that it allows it to move rotationally (as on a gimbal or a set of gimbals) or translationally (such as on tracks) such that it can continue to track a target as the target moves into, through, and beyond, the monitored area. In an embodiment, the RSOC is mounted on a gimbal providing for a type of 3 axis rotation up to 180 degrees vertically and 360 degrees horizontally when mounted to a flat ceiling. For the wall mounted version, the HM can rotate up to 180 degrees horizontally and 360 degrees vertically. In an embodiment, the HM can track over a full hemispheric view of the area allowing the radar system to continuously track and scan targets as they enter and exit.

At 801, the device exists in standby mode until it is active at 802. In an embodiment, activation is caused by motion, or is caused by a human form detected using the components mounted on the device, or remote but in communication with the device, which causes the processor to send a signal to the RSOC to initiate a concealed scan. In an embodiment, the RSOC is continuously scanning, and captures data when it detects the target approaching Motion can also be detected using the RSOC, or a combination of the camera and the RSOC, or a microphone. In any of the motion detection modes, any known algorithm or method can be used for motion detection.

At 803, a human outline or other predetermined form is identified, and the RSOC scans for objects using one or more combinations of the processes described herein, using any known and practicable algorithm. In an embodiment, using visual images, an AI engine detects the outline of the human form and then targets the centroid of the form to conduct the scan. Alternatively, the RSOC itself could also be placed in a continuous scan mode to detect the human outline and then conduct the object scan.

If the target is not moving, the scanning is performed until completed. If, however, a determination is made that the target is moving, at 804, then a signal is sent to the HM to track the target. The determination that the target is moving can be made by a processor located on the HM, a processor located at a CMA, a person, or any combination of the above.

At 805 the target is tracked by the device as the device moves on its gimbal or gimbals. Alternatively, the device can be moved along a track to follow the path of the target. In an embodiment, the target can be tracked using a processor on the device that sends signals to the gimbal causing the HM to track the target. In an embodiment, a human operator can control the gimbal or other tracking hardware by sending a signal to cause the device to track or otherwise aim at the target or targets. In an embodiment, the device can receive a signal sent remotely and automatically from a processor in communication with the device to track the target.

In an embodiment, the gimble is pre-programmed to move or sweep automatically and scan targets as they are detected. In an embodiment, the HM detects targets as they appear in the field of view; the HM learns the environment and any changes to the baseline of sufficient magnitude (e.g., a person enters the field of view during a scan) would trigger a radar scan. Additionally, the HM could be programmed to track the target as part of the process detailed herein.

As the target is scanned, the HM uses any known and practicable motion detection algorithm to determine whether the target is moving, and to track the target. The gimbal or gimbals can be controlled by a servomechanism, a motor, or a combination thereof, which receives signals from the HM processor to move while tracking the target. The signal to move the device using the gimbals or motors can originate from a processor located on the HM, or in communication with the HM, and the processor in communication with the gimbals or motors can use any practicable algorithm to control the direction and orientation of the device. In an embodiment, the tracking algorithm will attempt to track the target such that the centroid of the target in the centered in the field of view of the RSOC. As the target moves, updates will be provided to move the HM laterally or vertically using the gimbals or tracks to ensure the HM continues to be centered on the target.

At 806 the data, metadata, and images from the scanning process are logged, and at 807 the data, metadata, and images are transmitted to the CMA, and at 808 the images, (still and/or video) are transmitted in real time to the CMA.

At 809, the HM determines whether the target is still in its field of view, and if so, the HM continues to track the target. Once the HM determines that the target is no longer in its field of view, then at 809, the device enters standby mode and returns to its original position.

If multiple targets exist in the field of view (for example, multiple people have walked into the field of view), in an embodiment, the HM centers the field of view to track the centroid of the group. In addition to tracking a target or targets, the HM can be programed to remain in a static position so that, in the case that too many targets are present to track using the gimble, for example, when a stream of people traverses the field of view, the HM can detect hidden objects as targets pass through the FOV.

Figure 9:
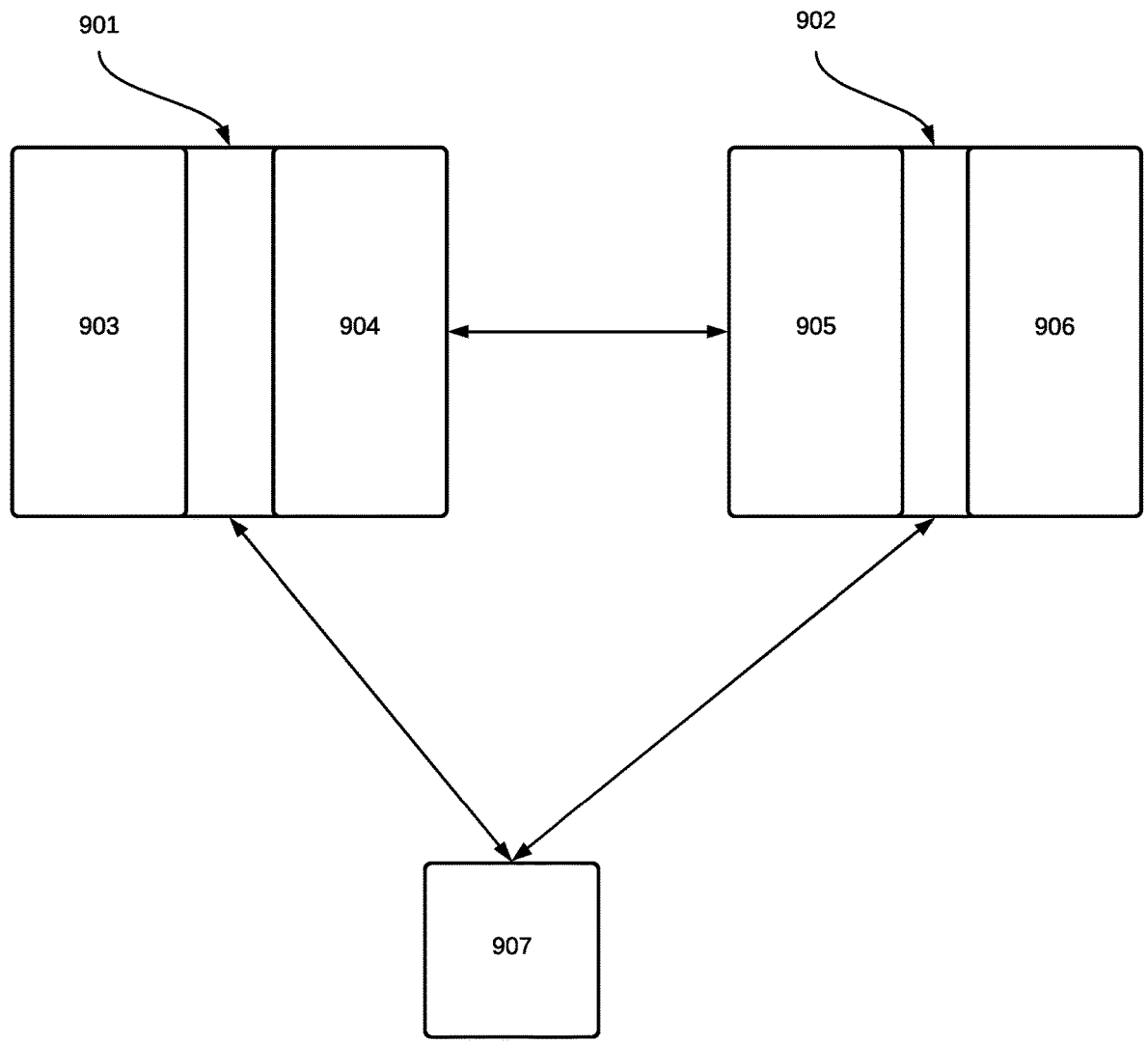
FIG. 9 is a block diagram of a schematic for a system of a collaborative hall monitor system including multiple collaborative coherent radar systems, each on their own chip.

FIG. 9 is a block diagram of a schematic for a system of a collaborative hall monitors including multiple collaborative coherent radar systems, each on their own chip. In an embodiment, the system includes hall monitor 901, hall monitor 902, and central management area 907. Hall monitor 901 includes RSOC 903 with its field of view and processor 904. Hall monitor 902 includes processor 905 and RSOC 906 with its field of view. In an embodiment, hall monitor 901 and hall monitor 902 are configured to be in communication with each other, where processor 904 is configured to include instructions to process a signal that originates at hall monitor 902, and processor 905 is configured to include instructions to process instructions that originate at hall monitor 901.

In an embodiment, hall monitor 901 and 902 are configured to be in communication with central management area 907. In an embodiment, central management area 907 can be a remote server, computer system or computer network. In an embodiment, central management system 907 can be a single handheld device, or can be multiple handheld devices in communication with one another. One skilled in the art will understand that, while two hall monitors are shown in FIG. 9, the system is scalable to three, four, or more hall monitors.

Figure 10:
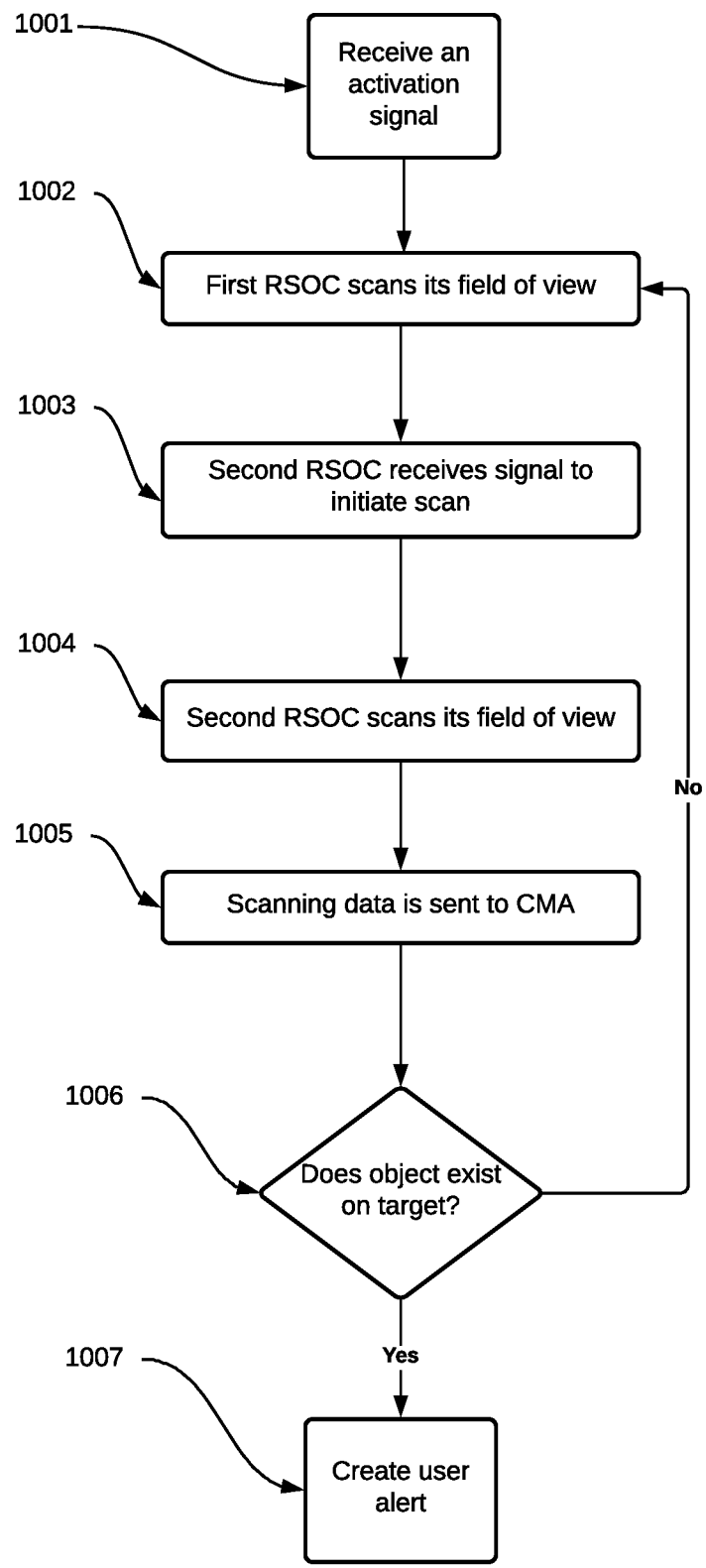
FIG. 10 is a flowchart of a method for using a collaborative hall monitor system according to an embodiment of the invention.

FIG. 10 is a flowchart of a method for using a collaborative hall monitor system according to an embodiment of the invention. At 1001, a first hall monitor receives an activation signal. In an embodiment, the first RSOC receives the activation signal and begins a continuous scan regardless of whether a target is within its field of view. In an embodiment, the activation signal is based on a detection event, which can include any combination of the following: a human form determined to be within the field of view, a motion detected in the field of view, a sound detected within an audio reception distance of the hall monitor, a predetermined time occurring, or a signal received from a source external to the hall monitor.

At 1002, the RSOC scans its field of view, and at 1003, a second RSOC receives a signal to initiate a scan. In an embodiment, the second RSOC receives the signal to initiate a scan from the first RSOC. In an embodiment, the second RSOC receives the signal to initiate the scan from an external source such as a central management area.

At 1004, the second RSOC scans its field of view. At 1005, scanning data is sent to the central management area. In an embodiment, the scanning data is based on the scan of the first RSOC, the second RSOC, or both.

At 1006, a determination is made, based on the scanning data, as to whether a predetermined object (such as an impermissible weapon) is exists on the target. If the object is determined to exist, a user alert is created. In an embodiment, the user alert is sent to a user device.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

We claim:

1. A method comprising:
    scanning, by a first coherent radar system, including a first phased array antenna, on a first chip configured to provide a frequency modulated continuous wave in a terahertz range, a first field of view;
    receiving a signal, at a second coherent radar system, including a second phased array antenna, on a second chip configured to provide a frequency modulated continuous wave in the terahertz range, to initiate a scan in a second field of view, the signal being based on the scanning by the first coherent radar system;
    scanning, in the terahertz range, the second field of view;
    transmitting, to a central management area, a data set based on the scanning of the first field of view and the second field of view;
    determining, based on at least one of the scanning of the first field of view or the second field of view, whether an object exists on a target;
    creating a user alert in response to the object being determined to exist on the target.

2. The method of claim 1, wherein the terahertz range is between 0.1 THz and 1 THz, inclusive.

3. The method of claim 2, further comprising:
    receiving, at the first coherent radar system, an activation signal to activate a scan mode of the first field of view;
    wherein the activation signal is based on a detection event, the detection event including at least one of a human form determined to be within the first field of view a motion detected in the first field of view; a sound detected within an audio reception distance of the first coherent radar system, a predetermined time occurring, or a signal received from an external source.

4. The method of claim 3, wherein the data set includes at least one of metadata or image data.

5. The method of claim 2 wherein the user alert includes at least one of an alarm, a rendered image representation of the object, or a rendered image representation of the target.

6. The method of claim 5, further comprising:
    receiving the data set; and
    logging the received data set.

7. A method comprising:
    scanning, by a coherent radar system that includes a phased array antenna on a chip that provides a frequency modulated continuous wave to scan in a terahertz range, a target;
    determining, at a processor in communication with the coherent radar system, whether the target is moving within a field of view of the coherent radar system;
    reorienting, in response to the determining whether a target is moving within the field of view, the coherent radar system to keep the target within the field of view;
    creating a scanning data set based on the scanning;
    determining, based on the scanning data set, whether an object is present on the target;
    transmitting an alert signal to create a user alert in response to the determining whether an object is present on the target.

8. The method of claim 7, wherein the terahertz range is between 0.1 THz and 1 THz, inclusive.

9. The method of claim 7, wherein the alert signal is sent to a central management area for at least one of storage or processing.

10. The method of claim 7, wherein the alert signal is configured to render an image on a user device.

11. The method of claim 7, further comprising determining when the target enters the field of view.

12. The method of claim 7, further comprising determining whether if the target has left the field of view.

13. The method of claim 12, wherein the coherent radar system is a first coherent radar system on a first chip, and wherein the phased array antenna is a first phased array antenna, and further comprising:
    scanning, by a second coherent radar system, including a second phased array antenna, on a second chip configured to scan in the terahertz range, the target.

14. The method of claim 13, further comprising:
    sending, to a central management area, a first data set based on the scanning by the first radar system;
    sending, to the central management area, a second data set based on the scanning by the second coherent radar system;
    activating an alert, the alert being based on at least one of the first data set or the second data set.

15. An apparatus comprising:
    a first coherent radar system, including a first phased array antenna, on a first chip configured to operate in a terahertz range to provide a frequency modulated continuous wave, and having a first field of view;
    a second coherent radar system, including a second phased array antenna, on a second chip configured to operate the terahertz range to provide a frequency modulated continuous wave, and having a second field of view;
    a first processor in communication with the first coherent radar system and configured to include instructions to:
    send a first signal to the first coherent radar system to scan a target with the first field of view;
    a second processor in communication with the second coherent radar system and configured to collaborate with the first processor, and further configured to include instructions to:
    send a second signal to the second coherent radar system to scan a target within the second field of view.

16. The apparatus of claim 15, wherein the terahertz range is between 0.1 THz and 1 THz, inclusive.

17. The apparatus of claim 16, wherein the first signal is based on a detection event, the detection event including at least one of a human form determined to be within the first field of view of the coherent radar system, a motion detected in the first field of view of the coherent radar system; a sound detected within an audio reception distance of the coherent radar system, a predetermined time occurring, or a signal received from an external source.

18. The apparatus of claim 17, wherein the first processor is further configured to send a data set to at least one of the second processor or a central management area.

19. The apparatus of claim 18, further comprising:
a housing containing at least one of the first coherent radar system and second coherent radar system; and
a gimbal configured to move the housing such that the target remains within at least one of the first field of view and the second field of view.

\* \* \* \* \*